United States Patent
Friedrich (10) Patent No.: US 6,354,660 B1
(45) Date of Patent: Mar. 12, 2002

(54) QUICK RELEASE LOCKING MECHANISM FOR GAME MACHINE CHAIR

(76) Inventor: Carl Friedrich, 244 Colonia Ave., Union, NJ (US) 07083

( * ) Notice: Subject to any disclaimer, the term of this patent is extended or adjusted under 35 U.S.C. 154(b) by 0 days.

(21) Appl. No.: 09/631,406

(22) Filed: Aug. 3, 2000

Related U.S. Application Data (60) Provisional application No. 60/147,672, filed on Aug. 6, 1999.

(51) Int. Cl.$^7$ .............................................. A47B 97/00
(52) U.S. Cl. ..................... 297/217.1; 297/174; 248/500
(58) Field of Search ............................ 297/174, 217.1, 297/217.3, 172, 463.1; 248/222.2, 221.11, 500

(56) References Cited

U.S. PATENT DOCUMENTS

| | | | |
|---|---|---|---|
| 4,840,343 A | 6/1989 | Gasser | 297/174 X |
| 5,083,738 A | 1/1992 | Infanti | 297/174 X |
| 5,522,641 A | 6/1996 | Infanti | 297/217.3 |
| 5,678,886 A | 10/1997 | Infanti | 297/217.3 |
| 5,762,617 A | 6/1998 | Infanti | 297/344.13 X |
| 5,791,731 A | 8/1998 | Infanti | 297/217.3 |

*Primary Examiner*—Peter R. Brown
(74) *Attorney, Agent, or Firm*—Anthony J. Casella; Gerald E. Hespos (57) ABSTRACT

A quick release mechanism is provided for a game machine chair. The chair is securely mounted to a planar base having a front edge. The game machine is provided with a downwardly opening locking channel with a front wall that faces the chair. Tapered structures on the base and/or on the locking channel cooperate to align the base with the locking channel. The base further includes a locking aperture or a locking projection near the front edge of the base. A latch is trapped in a latch cavity of the locking channel. Forward sliding movement of the base on the floor causes the front edge of the base to engage the latch. These sliding forces will lift the latch sufficiently for the latch to align with the locking aperture or projection on the base. This engagement holds the base and the chair in fixed relationship to the gaming machine. A key way is provided in the locking channel and is accessible by a key to disengage the latch from the base to enable the worker to access the machine.

14 Claims, 11 Drawing Sheets

QUICK RELEASE LOCKING MECHANISM FOR GAME MACHINE CHAIR

This application claims the benefit of U.S. Provisional Patent Appl. No. 60/147,672 which was filed on Aug. 6, 1999.

BACKGROUND OF THE INVENTION

1. Field of the Invention

The subject invention relates to a mechanism for quickly and easily securing a chair to a game machine and for easily effecting release of the chair from the game machine.

2. Description of the Prior Art

Game machines, such as slot machines, typically define upright rectangular structure with a front face that can be accessed by the user of a machine. The front face typically includes a changeable display of indicia to indicate whether the user has won and the amount of any such winning. The front of the machine further includes a slot or other such opening which receives the user's payment for the game. An actuator, such as a pivotable arm, typically is accessible from the front of the machine to enable the user to activate the machine after the required payment has been made. Furthermore, the front of the machine includes an opening from which any winnings will be dispensed. All of these operative parts of the game machine typically are disposed at a height that can be accessed easily by a user standing in front of the machine.

The prior art game machine also typically includes a securely locked cash box that can be accessed by the owners of the gaming establishment. The locked cash box will receive the payments from the users of the machine. Periodically the owners of the gaming establishment will open the receptacle to clean out the coins, chips or other payment that have been deposited by users of the machine.

Many users of game machines will play a particular machine for a considerable time. Thus, owners of gaming establishments often provide chairs for the users of the game machines. The seats of these chairs are at a sufficient elevation to enable the user of such a machine to be supported at a height with the arms and head at roughly the elevation appropriate of an individual standing in front of the gaming machine. Thus, a typical chair for a game machine is at a height more normally associated with a stool.

Many casinos or other gaming establishments have a large number of slot machines. Most casinos and other gaming establishments endeavor to create an orderly and attractive appearance. Thus, there is a desire to have the chairs for game machines and the chairs arranged in an orderly manner. This orderly arrangement can be achieved by fixing the base of the game machine chair in proximity to the front of the game machine. The secure mounting of the game machine also achieves several safety functions. For example, the affixation of the chair relative to the game machine ensures sufficiently wide aisles between rows of game machines, and hence ensures safe and easy ingress and egress from the casino. Additionally, the fixed mounting of the chairs to the game machines will prevent a tired or inebriated customer from toppling the chair while playing the game machine. Still further, there is a potential that an emotional game player could throw a chair. The affixation of the chair to the game machine prevents such an emotional outburst.

The fixed mounting of the game machine chair in front of the game machine unfortunately impedes the access to the cash box. Furthermore, the electrical and/or mechanical components of game machine require periodic servicing. The permanently mounted game machine chair complicates such servicing. As a result, most game machine chairs are provided with a quick release mechanism to facilitate disengagement of the chair from the machine and subsequent reconnection of the chair to the game machine.

One prior art structure for releasable engagement of a game machine chair to the machine is shown in U.S. Pat. No. 5,522,641. This prior art patent shows a chair mounted to the top end of a vertical post. The lower end of the post is secured to the generally planar base that extends from the post toward the game machine. Most of the base is substantially planar. However, the portion of the base closest to the game machine defines an upwardly curled lip. The game machine is provided with a downwardly opening channel on the lower portion of the front surface of the game machine. The game machine chair and its base can be tilted toward the game machine and about the upwardly curled front lip of the base. This tilting enables the lip to be slid under the downwardly opening channel on the game machine. The chair and its base then can be pivoted back toward the floor with the upwardly curled lip securely engaged in the channel of the game machine. This prior art game machine chair prevents unintended movement of the chair and ensures an orderly row of chairs in front of the respective game machines. However, the tilting of the chair to access the cash box can be cumbersome and difficult.

Another prior art game machine chair is shown in U.S. Pat. No. 5,791,731. The game chair in this patent requires locking pins or swinging latches that must be manually removed to physically disengage the base of the game machine chair from the game machine. This prior art game machine chair avoids the cumbersome lifting and tilting of the entire game chair and base to effect engagement and disengagement. However, the existing latch mechanisms create hazardous sharp areas near the feet of the game patron sitting in the chair. Furthermore, the existing latch mechanisms are aesthetically unattractive and are easily accessible by a patron who would like to move the chair. Even a small number of displaced chairs can create an aesthetically unattractive appearance for the entire casino and can block the aisles between rows of game machines.

In view of the above, it is an object of the subject invention to provide a quick release mechanism for a game machine chair that does not require tilting of the chair and its base.

Another object of the subject invention to provide a quick release game machine chair that requires a special tool or key to release the chair and its base.

A further object of the subject invention is to provide a game machine chair with a base that is easily aligned with locking mechanisms on the game machine.

SUMMARY OF THE INVENTION

The subject invention is directed to a game chair assembly for use with a game machine supported on or near the floor. The game machine includes a front face that may extend upwardly from a location at or near the floor. A locking mechanism is disposed substantially adjacent the floor and in proximity to the front face of the game machine. The locking mechanism is described in greater detail below.

The game machine chair includes a generally planar base to be supported on the floor in front of the game machine. More particularly, the base includes opposed front and rear ends. The chair further includes a post with a lower end secured to the base at a location between the opposed front and rear ends. The post further has an upper end remote from the base. A chair is securely affixed to the upper end of the post.

The front end of the base is releasably engageable with the locking mechanism of the game machine. More particularly, the front of the base may be provided with a plurality of tapered guide surfaces that align with structural elements on the locking mechanism of the game machine for guiding the base into a proper position relative to the locking mechanism and the game machine. For example, the base may be provided with a plurality of V-shaped notches or chamfered corners that engage pins extending downwardly on the locking mechanism.

The base may further include a locking aperture at a location spaced slightly rearwardly from the front edge of the base. The locking aperture may be disposed centrally between the tapered guide surfaces at the front edge of the base.

The locking mechanism at the lower front of the game machine may include a latch for releasably engaging the locking aperture of the base. The latch may be vertically movable in the locking mechanism of the game machine between an upper position and a lower position. In the upper position, the latch may permit the base of the game machine chair to be slid entirely into the locking mechanism of the game machine. In the lower position, the latch will releasably engage the aperture in the base of the game machine chair. The lower front end of the latch may be tapered. Thus, the sliding movement of the base of the game machine chair against the lower front edge of the latch will cause the latch to lift upwardly toward its upper position, thereby enabling the base to be inserted fully into the locking mechanism of the game machine. After sufficient insertion of the base, the latch will align with the locking aperture. Thus, the latch will fall into the locking aperture, thereby locking the base in fixed relationship to the game machine.

The locking mechanism may further include an inverted channel in which the latch is movably positioned. The channel may include an unlocking opening aligned with the latch. The unlocking opening may be accessed by a tool or key to enable the latch to be lifted from its lower position toward its upper position. The lifting of the latch will enable the game machine chair to be slid rearwardly and away from the game machine.

With the above-described construction, the game machine chair can be locked to the game machine merely by sliding the base into the locking mechanism of the game machine. The game machine chair then can be released from the game machine merely by inserting a lever or key into the unlocking opening of the locking mechanism for lifting the latch away from the base, and enabling movement of the chair away from the game machine. Patrons of the gaming establishment will not have a key or lever, and hence cannot move the chair. Additionally, the latch is obscured from view by the channel of the locking mechanism on the game machine, and hence the locking mechanism has no sharp edges that can be accessed by a patron. Furthermore there are no aesthetically unattractive components of the locking mechanism that are visually apparent to patrons of the gaming establishment.

In other embodiments of the subject invention, the base may include a projection that extends a short distance upwardly for locked engagement with the latch on the game machine. The projection may have a tapered upper front edge aligned to cooperate with the tapered lower front edge on the latch.

In still other embodiments, the base may include an anchoring aperture at a location rearwardly from the locking aperture or locking projection. The anchoring aperture may align with an anchor in the floor in front of the game machine. The anchor may be securely mounted at a location to register with the anchoring aperture of the base when the base is fully locked in the locking mechanism. The anchoring aperture may be defined by a tapered edge that engages under a lip on the anchor. Thus, the anchoring aperture and the anchor cooperate with the above-described locking mechanism to further secure the game machine chair in proximity to the game machine.

DETAILED DESCRIPTION OF THE PREFERRED EMBODIMENTS

Figure 1:
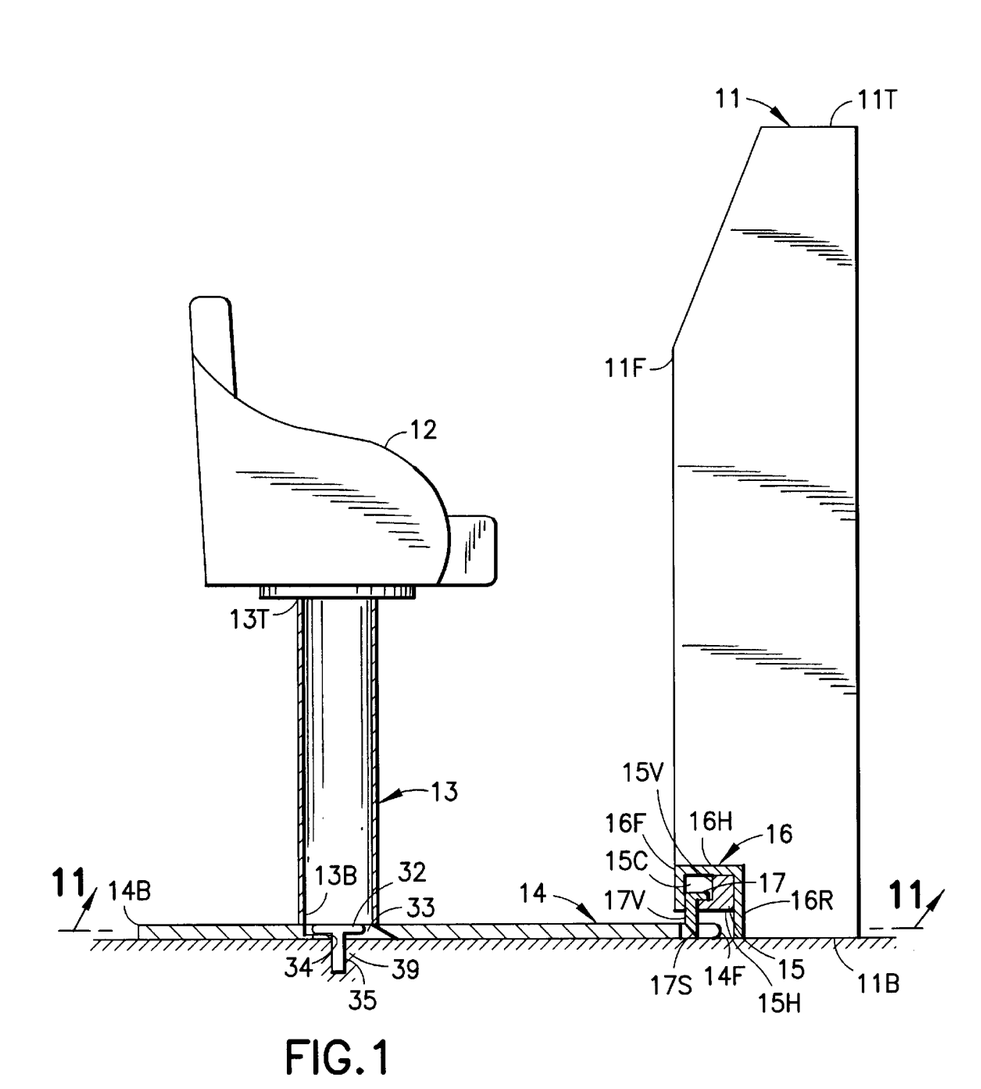
FIG. 1 is a side view sketch, partially in section, of a game stool assembly showing the latching mechanism.

A quick release chair in accordance with the subject invention is identified generally by the numeral 10 in FIG. 1. The quick release mechanism 10 is used with a gaming machine 11 that has a top 11T, a bottom 11B and a front 11F. The bottom 11B of the gaming machine 11 is supported on a floor F. Portions of the front face 11F in proximity to the top 11T of the gaming machine 11 are provided with a prior art array of indicators that are viewable to a patron using the gaming machine 11. The indicators may include variable images to indicate winning or losing games. The front face 11F also may include a slot or other such means to enable a patron to pay for games, an actuator for initiating a game after payment and a return opening for the deposit of winnings. A portion of the front face 11F closer to the bottom 11B includes a securely locked cash box into which coins, chips or tokens of patrons are deposited. Periodically, the operators of a casino or other gaming establishment will access the cash box for emptying the coins.

The quick release mechanism 10 also includes a chair 12, a post 13 and a base 14. The chair 12 may be of conventional design. The post 13 may also be substantially of conventional design. More particularly, the post 13 includes a top end 13T securely mounted to the chair 12 and a bottom end 13B securely mounted to the base 14.

Novel aspects of the quick release mechanism are located primarily in the base 14 and portions of gaming machine 11 in proximity to the bottom 11B and front face 11F thereof. More particularly, as shown most clearly in FIG. 2, the base 14 is a substantially rigid planar member that preferably is formed from a metal, such as aluminum. The base 14 includes a rounded front edge 14F, a back edge 14B and opposed side edges 14L and 14R. The post 13 is mounted to the base at a location centrally between the side edges 14L and 14R and at a location slightly closer to the back edge 14B than to the front edge 14F.

Figure 2:
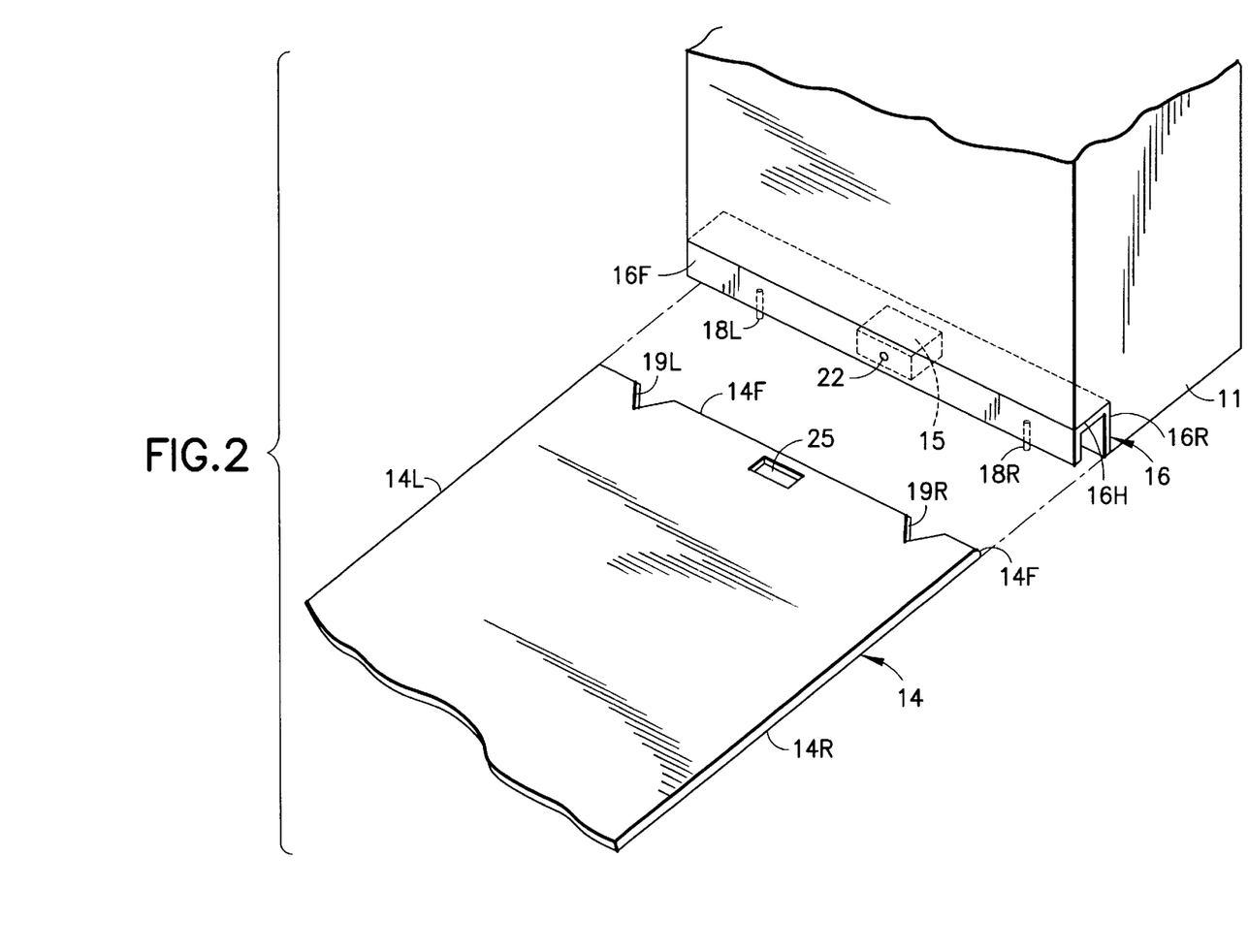
FIG. 2 is a partial perspective view of FIG. 1 showing the base prior to its engagement to a channel located underneath the gaming machine.
Figure 3:
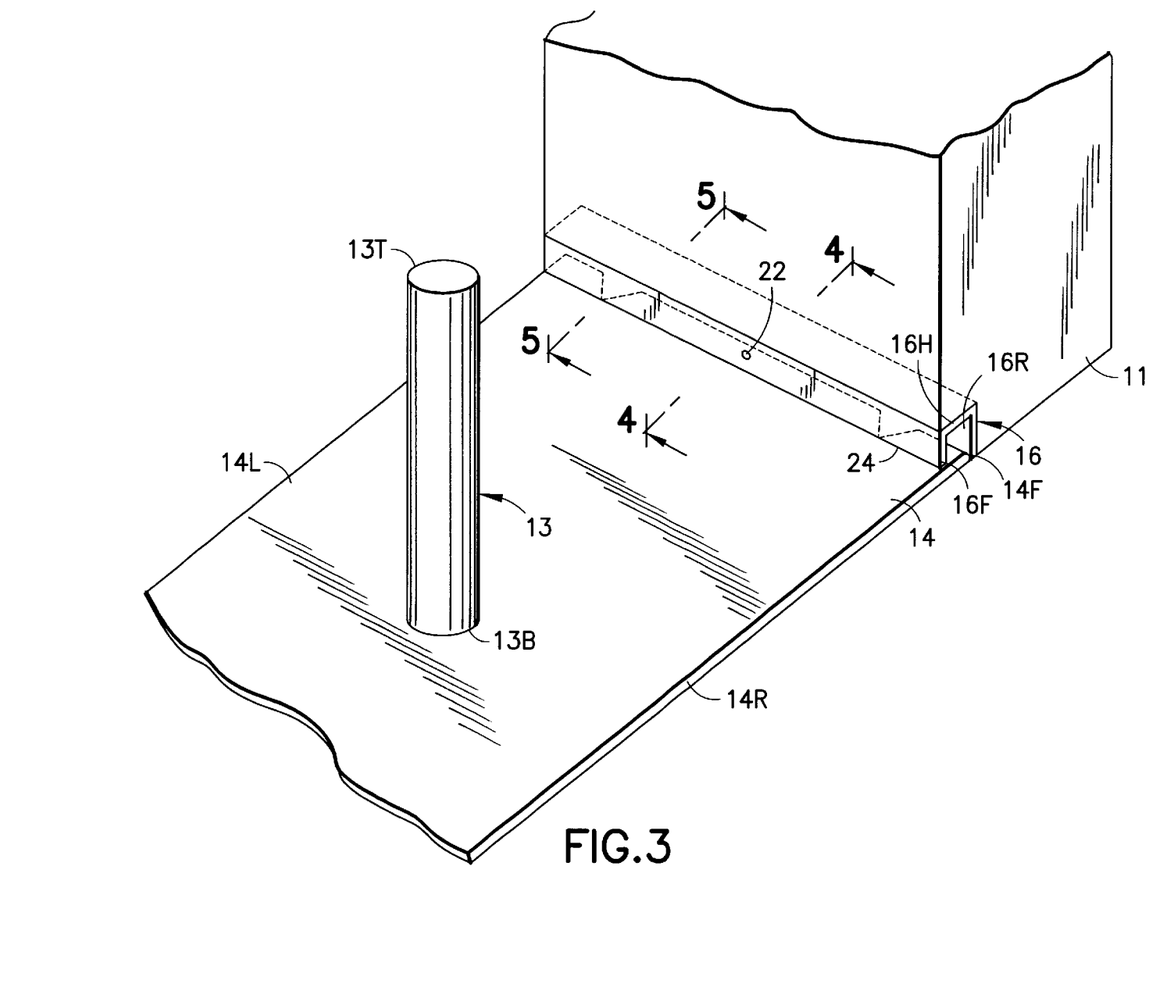
FIG. 3 is a partial perspective view showing the base of FIG. 2 already engaged to the channel located underneath the gaming machine.

The front edge 14F of the first embodiment is characterized by a pair of V-shaped notches 19L and 19R at locations spaced symmetrically inwardly from the respective side edges 14L and 14R. The base 14 further includes a locking aperture 25 with a locking surface disposed centrally between the notches 19L and 19R and spaced slightly rearwardly from the front edge 14F.

Quick release mechanism 10 further comprises a locking channel 16 fixedly secured to the gaming machine 11 at the front face 11F. The locking channel 16 extends across substantially the entire width of the game machine 11 substantially adjacent the floor F. The locking channel 16 is substantially an inverted U-shape and includes a vertically aligned rear wall 16R affixed to a vertical surface on the gaming machine 11 and a horizontal wall 16H extending rigidly from the rear wall 16R. A front wall 16F extends downwardly from the horizontal wall 16H and is substantially parallel to the mounting rear wall 16R. The rear wall 16R extends further from the horizontal wall 16H than the front wall 16F. Thus, as shown most clearly in FIG. 1, the front wall 16F is spaced upwardly from the floor F by a distance greater than the thickness of the base 14.

The locking channel is provided with a pair of guide pins 18L and 18R extending downwardly from the front wall 16F substantially to the floor F. The alignment pins 18L and 18R are disposed to align with the V-shaped notches 19L and 19R respectively. Thus, the V-shaped notches 19*l* and 19*r* cooperate with the alignment pins 18*l* and 18*r* respectively to guide the base 14 into proper alignment with the locking channel 16. More particularly, any slight misalignment of the base 14 relative to the locking channel will be corrected in response to forward sliding forces on the base 14 due to a camming effect between the edges of the V-shaped notches 19L and 19R and the corresponding alignment pins 18L and 18R.

The locking channel 16 further includes a latch housing 15 disposed centrally between the alignment pins 18L and 18R. The latch housing 15 includes a horizontal latch support wall 15H and a vertical wall 15V which define a latch cavity 15C in the corner between the horizontal wall 16H and the front wall 16F of the locking channel 16.

A latch 17 is slidably disposed in the latch cavity 15C. More particularly, the latch includes a horizontal stop wall 17H slidably trapped within the latch cavity 15C for movement between the horizontal wall 16H of the locking channel 16 and the horizontal wall 15H of the latch housing 15. The latch 17 further includes a vertical wall 17V that projects rigidly from the horizontal wall 17H. The vertical wall 17V is characterized by a slanted lower front face 17S. The slanted face 17S defines a height equal to or slightly greater than the thickness of the base 14. As a result, the sliding movement of the base 14 toward the gaming machine 11 will cause the front edge 14F of the base 14 to engage the slanted face 17S of the latch 17. Camming forces between the base 14 and the slanted face 17S will urge the latch 17 upwardly in the latch cavity 15C. Additionally, the cooperation between the V-shaped notches 19L and 19R and the corresponding alignment pins 18L and 18*r* will ensure that the locking aperture 25 of the base 14 aligns with the latch 17. Sufficient sliding movement of the front edge 14F of the base 14 under the front wall 16F of the locking channel 16 will align the locking aperture 25 of the base 14 with the latch 17. The latch 17 then will fall gravitationally downwardly and into the locking aperture. This engagement of the latch 17 with the locking aperture 25 will prevent rearward sliding movement of the base 14 away from the gaming machine 11. Additionally, engagement of the latch 17 with the locking aperture 25 prevents transverse movement of the base 14 relative to the gaming machine 11. Still further, the engagement of front portions of the base 14 beneath the front wall 16F of the locking channel 16 prevents rearward tilting of the assembly comprising the chair 12, the post 13 and the base 14. Still further, no part of the latch 17 is exposed. Consequently, a patron cannot be injured by any portion of the latch 17 and a patron cannot access the latch 17 for intentionally disengaging the base 14 from the gaming machine 11.

As explained above, owners of a casino must periodically access and empty the contents of the cash box. This frequent task cannot be accomplished efficiently while the chair 12 is in the position illustrated in FIG. 1. Accordingly, as shown in FIG. 2, the front wall 16F is provided with an unlocking aperture 22 aligned with the latch 17. The unlocking aperture 22 is dimensioned to receive a key 20 to enable a lifting of the latch 17 out of the locking aperture 25. In the embodiment illustrated in FIG. 4, the latch 17 is provide with a tapered aperture 23. Additionally, the latch housing 15 is provided with a key opening 24 aligned with the unlocking opening 22 in the front wall 16F. The tapered aperture 23 in the latch 17 is disposed to be offset from the unlocking opening 22 when the latch 17 is engaged in the locking aperture 25 of the base 14. However, the key 20 has a tapered leading end that can be slid horizontally into the unlocking opening 22. The tapered leading end of the key 20 will slide against the tapered aperture 23 in the latch 17. As the key 20 continues into the key opening 24 of the latch housing 15, ramping forces developed between the tapered aperture 23 and the tapered leading end of the key 20 will lift the latch 17 sufficiently for disengagement from the base 14. The base 14 then can be slid away from the locking channel 16, thereby enabling the worker to access the cash box. This disengagement merely requires the linear insertion of the key 20 into the unlocking aperture 22 followed by the sliding of the base 14 horizontally away from the gaming machine 11. No complex maneuvering of plural latches is required, and no tilting of the base 14 is required.

Figure 4:
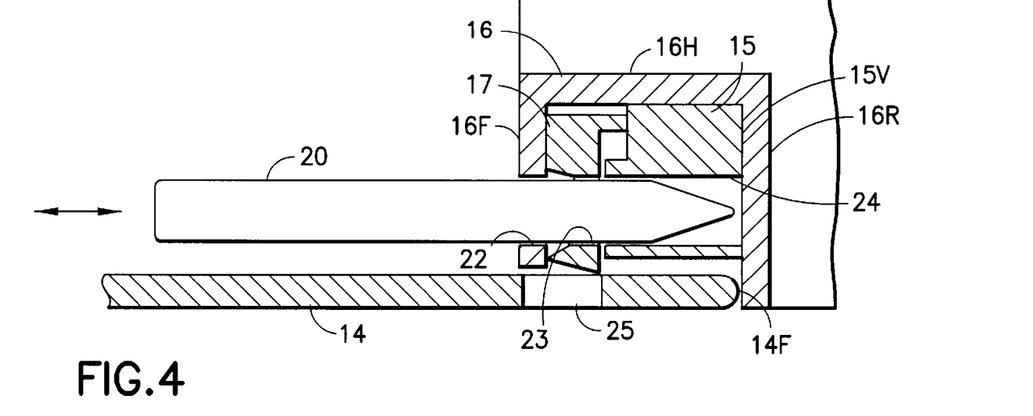
FIG. 4 is a sectional view of the latching mechanism taken along line 4—4 of FIG. 3 with the key in place.
Figure 5:
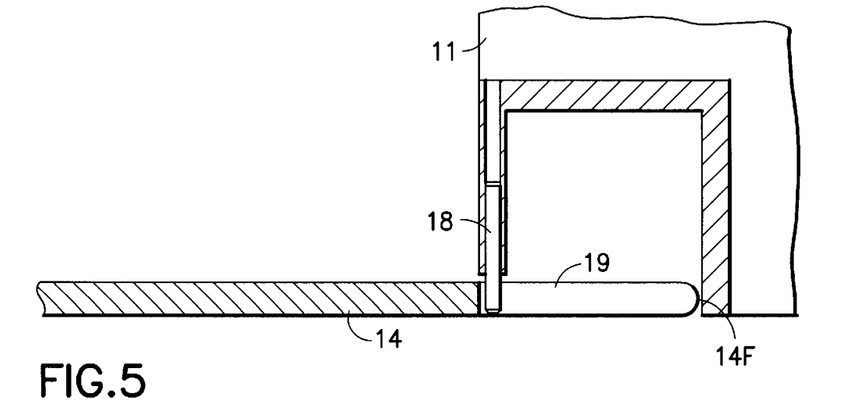
FIG. 5 is a sectional view of the alignment mechanism taken along line 5—5 of FIG. 3.
Figure 6:
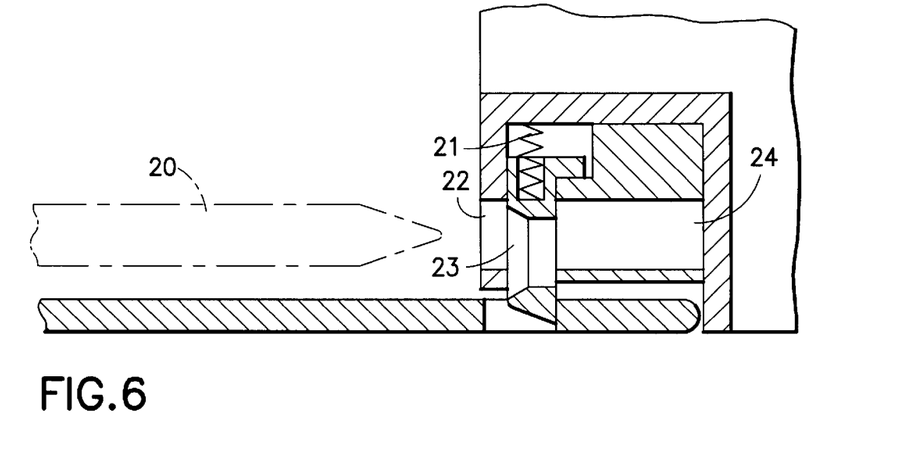
FIG. 6 is a sectional view of the latching mechanism take along line 4—4 of FIG. 3.

FIG. 6 shows a slight variation of the embodiment shown in FIG. 4. In particular, the FIG. 4 embodiment relies entirely upon the downward gravitational movement of the latch 17 to effect locking. However, the FIG. 6 embodiment employs a coil spring 21 between the latch 17 and the horizontal wall 16H of the locking channel 16. The spring 21 assists in the downward locking movement of the latch 17.

Figure 7:
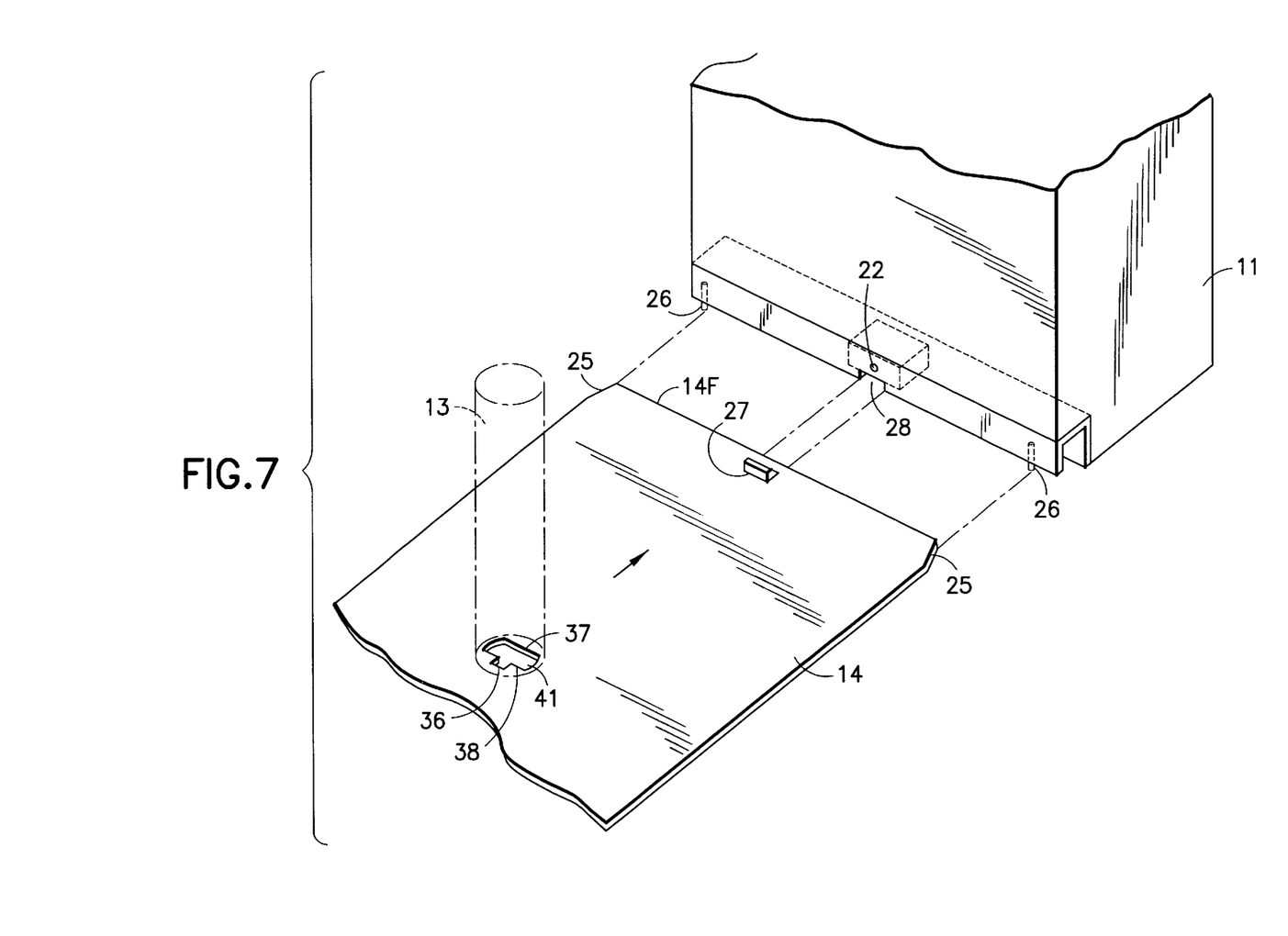
FIG. 7 is a partial perspective view of another embodiment showing the base prior to its engagement to a channel located underneath the gaming machine.

FIG. 7 shows a slight variation of the embodiment shown in FIGS. 1–6. In particular, the FIG. 7 embodiment includes chamfered corners 25 adjacent the front edge 14F of the base 14. Locking channel 16 includes alignment pins 26 at more outward locations. The chamfered corners 25 will engage the alignment pins 26 to guide the base 14 into a central position relative to the locking channel 16.

The FIG. 7 embodiment further shows a locking projection 27 adjacent the front edge 14F of the base 14 and centrally between the side edges 14L and 14R. Projection 27 includes a ramped front face 27F aligned at an acute angle to the planar base plate and a locking rear face 27R aligned perpendicularly to the planar base plate 14. A projection may be mounted in a stepped aperture 31 in the base plate 14. The aperture preferably has a cross-sectionally small top portion and a cross-sectionally large bottom portion. The projection 27 includes an enlarged bottom end dimensioned to seat in the cross-sectionally large bottom portion of the aperture. The projection 27 may be welded or otherwise secured into the aperture.

The embodiment depicted in FIGS. 7–10 further includes a notch 28 formed in the front wall 16F at a location aligned with the latch cavity 17C. The notch 28 is dimensioned to slidably receive the projection 27. Thus, the front edge 14F of the base 14 can be slid under the front locking wall 16F of the locking channel 16 such that the locking projection 27 slides into the notch 28. Sufficient sliding movement of the base 14 toward the locking channel 16 will cause the ramped front face 27F of the locking projection 27 to engage the slanted lower front edge 17S of the latch 17. Camming forces between these tapered surfaces will cause the latch 17 to lift upwardly sufficiently for the locking projection 27 to slide under and past the latch 17. The latch 17 then will move down in response either to gravitational forces or forces generated by the spring 21 to hold base 14 in position. The base 14 can be removed by a worker merely by sliding a key 20 into the unlocking aperture 22 as described above with respect to the first embodiment.

Figure 8:
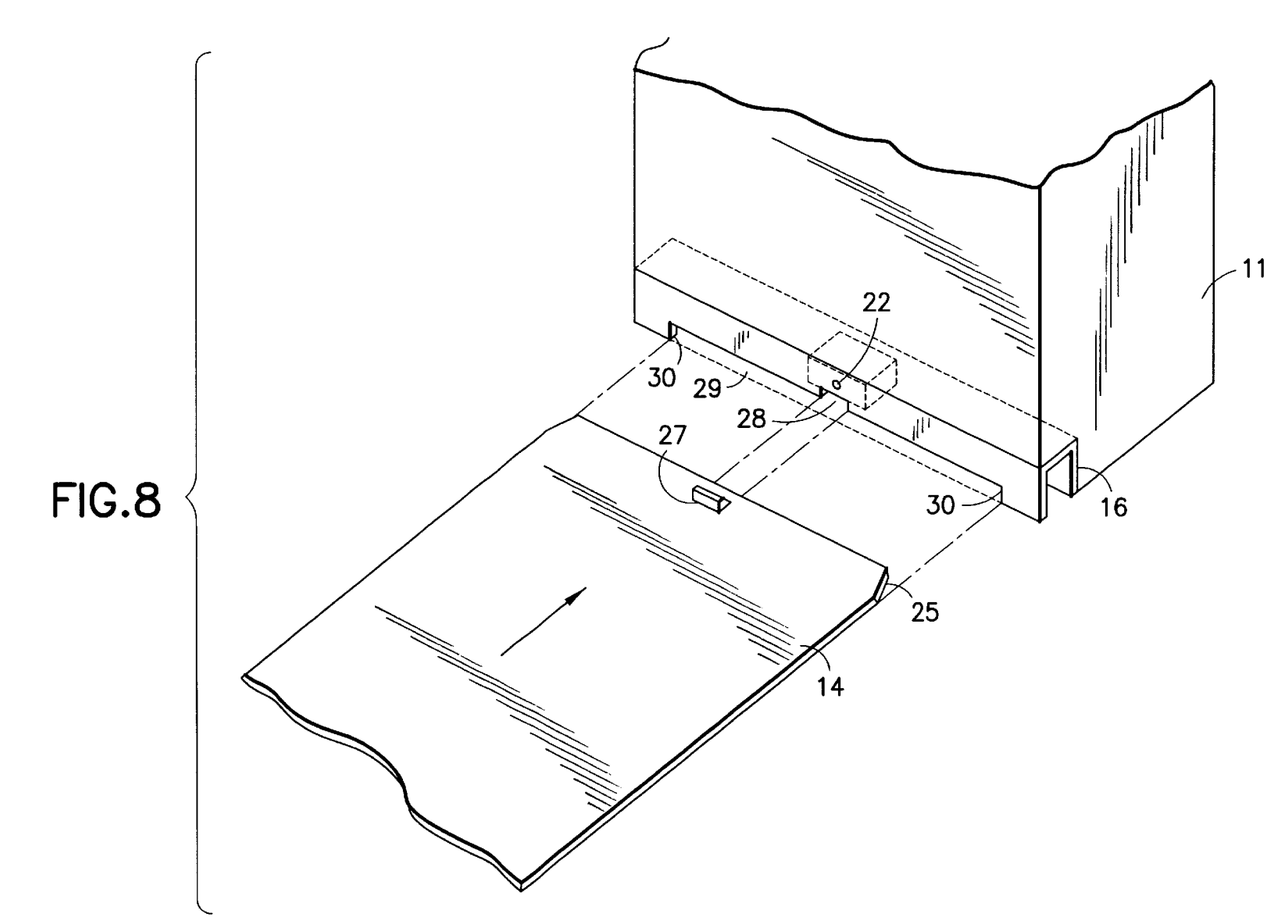
FIG. 8 is a partial perspective view of still another embodiment showing the base prior to its engagement to a channel located underneath the gaming machine.
Figure 9:
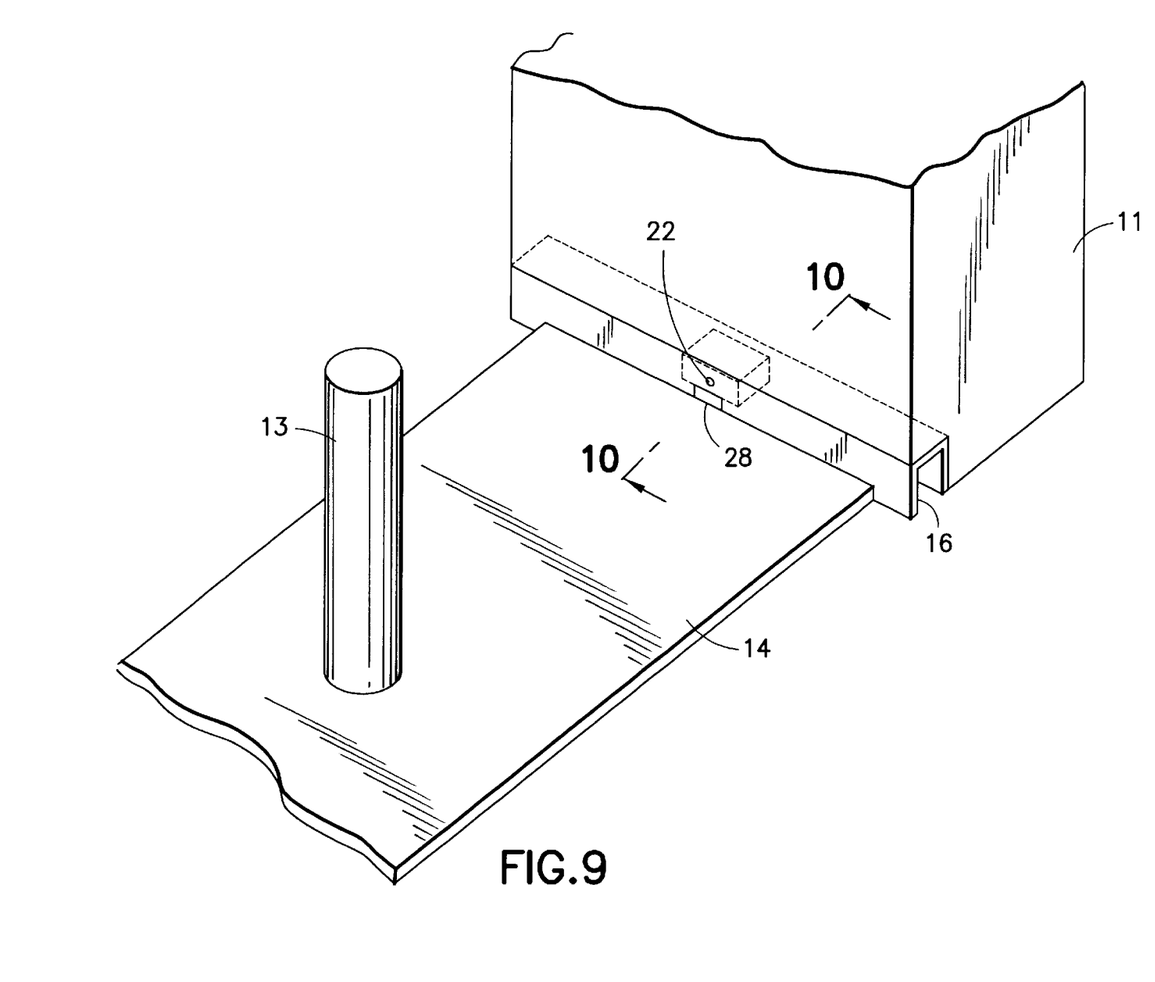
FIG. 9 is a partial perspective view showing the base of FIG. 8 already engaged to the channel located underneath the gaming machine.
Figure 10:
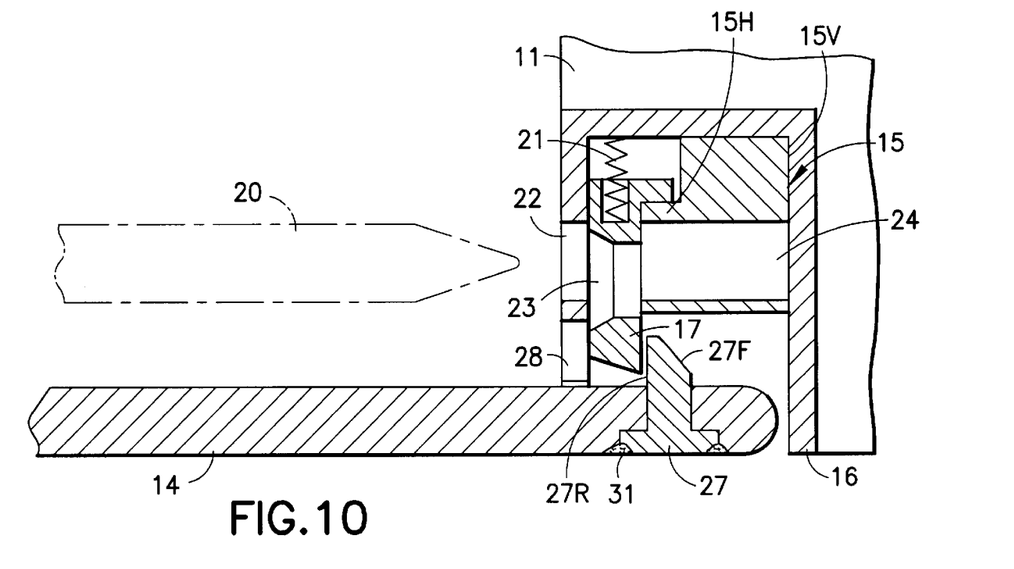
FIG. 10 is a sectional view of the latching mechanism taken along line 10—10 of FIG. 9.

A third embodiment is depicted in FIG. 8. The third embodiment is identical to the second embodiment of FIG. 7. However, instead of alignment pins 26L and 26R, the third embodiment illustrated in FIG. 8 includes legs 30L and 30R unitarily formed as part of the front locking wall 16F of the channel 16.

An alternate locking channel is illustrated in FIGS. 14–17 and is identified generally by the numeral 116. The locking channel 116 is machined from a unitary piece of metallic material such as aluminum or steel. The locking channel 116 includes a front face 118, an opposed rear mounting face 120, opposed left and right faces 122 and 124, a top face 126 and a bottom face 128. A plurality of mounting apertures 130 extend entirely through the locking channel 116 from the front face 118 to the rear face 120. Screws can be extended through the mounting apertures 130 and into a lower front portion of the game machine to securely hold the rear face 120 of the locking channel 116 against the lower front face of the game machine. Legs 132 and 134 extend downwardly from the bottom surface 128 in proximity to the respective left and right side faces 122 and 124 respectively. The legs 132 and 134 have planar bottom faces 133 and 135 respectively which are spaced below the bottom face 128 by a distance approximately equal to the thickness of the base 114. The legs 132 and 134 are machined to include grooves 136 and 138 respectively. Portions of each leg 132 and 134 below the respective grooves 136 and 138 define a tapered entry into the respective grooves 136 and 138. The grooves 136 and 138 necessarily define a thickness less than the overall thickness of the base 114.

The locking channel 116 is further provided with a pair of positioning pegs 142 and 144 spaced slightly inwardly from the respective legs 132 and 134. The pegs 142 and 144 are force fit into apertures (not shown) machined into the bottom face 128, and are disposed at locations to receive the positioning notches formed in the front edge of the base 114. Although positioning notches are not shown in FIGS. 14–17, comparable positioning notches are shown in FIG. 2 and are identified by the numerals 19L and 19R.

The bottom surface 128 is machined to define a latch cavity 146 at a location between the front and rear surfaces 118 and 120. As shown most clearly in FIG. 16, the latch cavity 146 is spaced forwardly from the face of the grooves 136, 138 nearest the rear face 120 of the locking channel 116. The locking channel further include an unlocking aperture 148 extending from the front face 118 into the locking cavity 146 at a location centrally between the left and right side surfaces 122 and 124. Additionally, the locking channel 116 includes an elongate vertically aligned aperture 150 extending from the rear surface 120 into the latch cavity 146. The elongate aperture 150 is offset from the unlocking aperture 148, and in this embodiment is closer to the right side surface 124.

Figure 16:
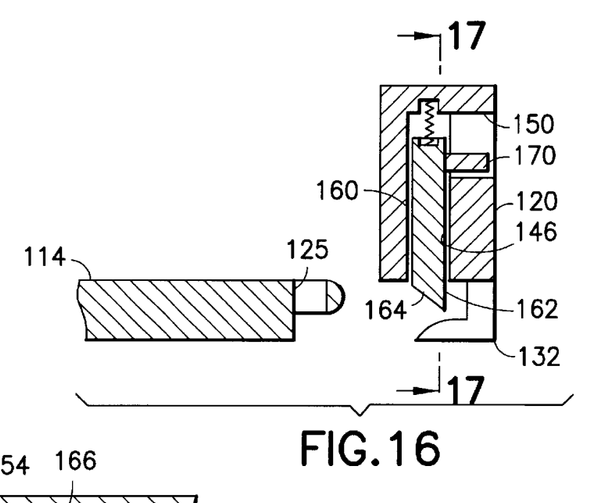
FIG. 16 is a cross-sectional view taken along line 16—16 and showing the front portion of a base.
Figure 17:
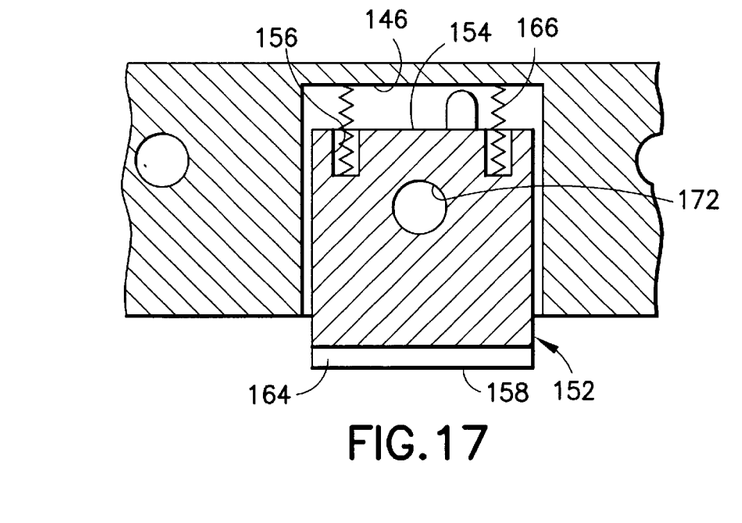
FIG. 17 is a cross-sectional view taken along line 17—17 in FIG. 16.

A latch 152 is slidably disposed in the latch cavity 146. More particularly, the latch 152 includes an upper surface 154 with a pair of machined spring cavities 156 extending a short distance downwardly. The latch 152 further includes a bottom edge 158, a front face 160 and a rear face 162. A chamfer 164 extends from the front face 160 to the bottom edge 158. As explained further below, the chamfer 164 will engage with the front edge of the base 114 for urging the latch 152 upwardly in the latch cavity.

A pair of springs 166 are engaged in the spring cavities 156 and extend upwardly to engage the top surface of the latch cavity 146 as shown most clearly in FIGS. 16 and 17. Springs 166 urge the latch 152 downwardly.

The rear face 162 of the latch 152 includes a threaded aperture disposed to align with the elongate aperture 150 in the locking channel 116. A set screw 170 is passed through the elongate aperture 150 and threadedly engaged in the aperture in the rear face 162 of the latch 160. The set screw 170 prevents the springs 166 from urging the latch 152 completely out of the latch cavity 146. However, the set screw 170 permits the latch 152 to be urged sufficiently downwardly for locked engagement in the locking aperture formed in the base plate 114. Thus, the latch 152 can reciprocate between an upper position where the bottom edge 158 of the latch 152 is substantially aligned with the bottom surface 128, and a lower position where the bottom edge 158 of the latch 152 is releasably engaged in the locking aperture 125 of the base 114.

The latch 152 further includes a central aperture extending from the front face 162 to the rear face 162. The central aperture 172 includes a tapered entry that is disposed to partly overlap with the unlocking aperture 148. However, as shown most clearly in FIG. 14, the aperture 172 in the latch 152 is axially offset to a slightly lower position than the unlocking aperture 148. Thus, as described with respect to FIG. 6, an unlocking tool with a tapered leading end can merely be urged axially into the unlocking aperture 148. Camming forces will automatically lift the latch 152 into an unlocking disposition that will enable the base 114 to be slid away from the locking channel 116 for accessing a cash box in the game machine.

With reference to FIG. 16, the base 114 differs slightly from the base 14 described and illustrated above. In particular, the front edge of the base 114 is undercut slightly on the bottom face of the base 114. The dimensions of the undercut enable the front edge of the base to be nested in the grooves 136 and 148 defined in the legs 132 and 134 respectively. The undercut can extend completely across the base 114 or can be localized near the extreme right and left edges of the base 114. In other embodiments, the legs 132 and 134 may not include the horizontal segment shown in FIGS. 15 and 16. In these situations, the base 114 need not have the undercut illustrated in FIG. 16.

Figure 11:
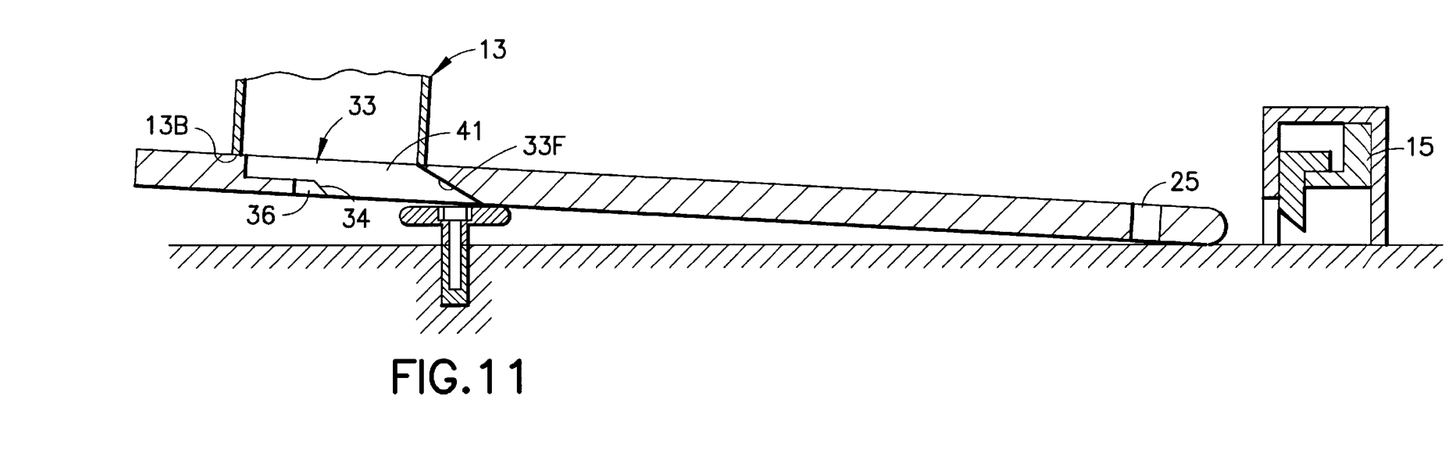
FIG. 11 is a sectional view of the latching mechanism taken along line 11—11 of FIG. 1, prior to engagement.
Figure 12:
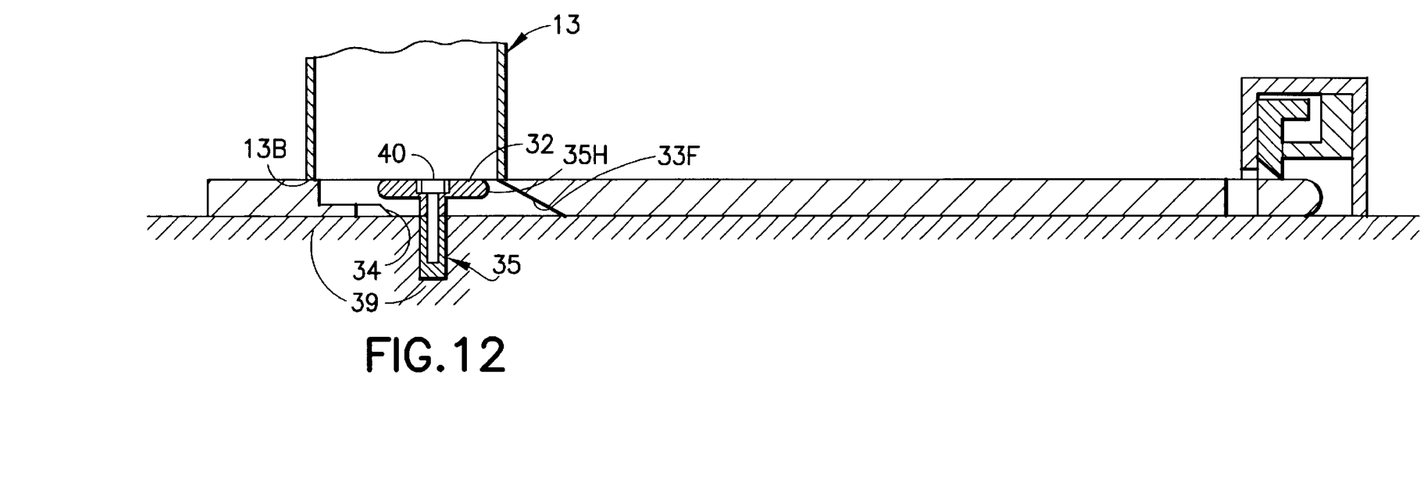
FIG. 12 is another sectional view of the latching mechanism taken along line 11—11 of FIG. 1 prior to engagement.
Figure 13:
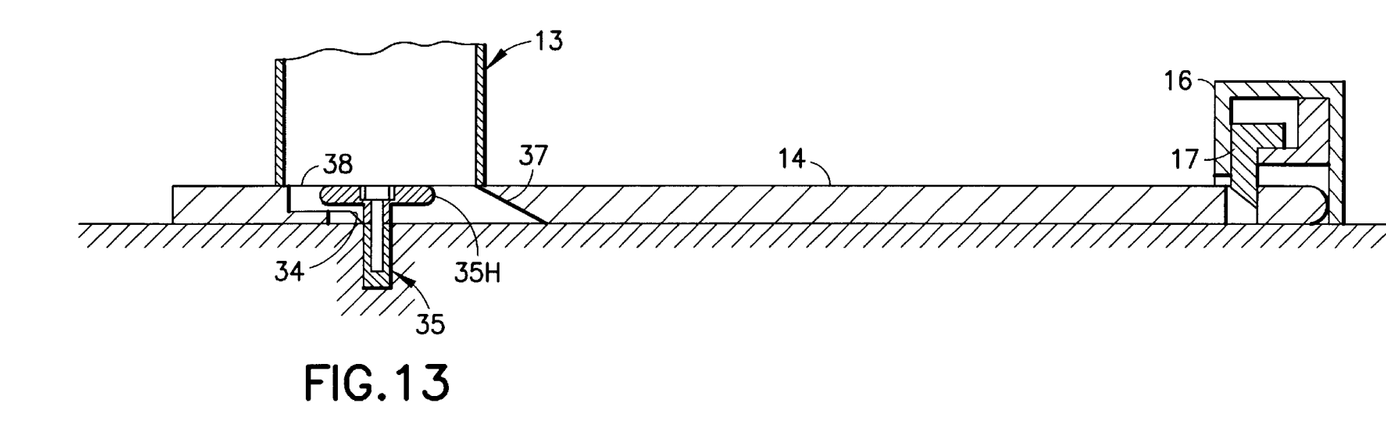
FIG. 13 is a sectional view of the latching mechanism taken along line 11—11 of FIG. 1.
Figure 14:
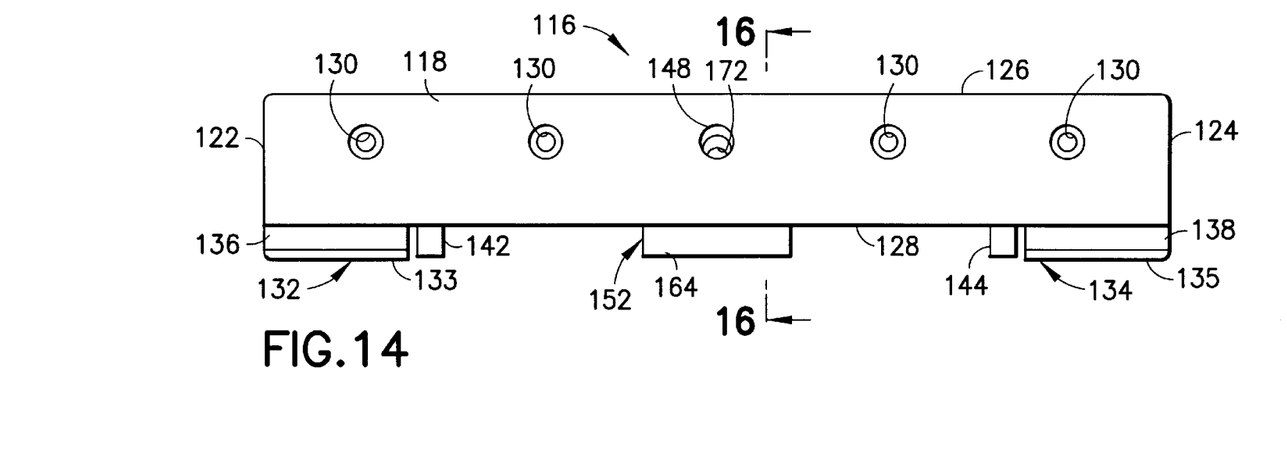
FIG. 14 is a front elevational view of an alternate locking channel in accordance with the subject invention.
Figure 15:
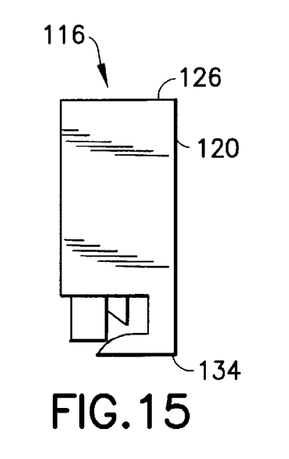
FIG. 15 is an end elevational view of the locking channel as viewed from the right end of FIG. 14.

The quick release mechanism of the subject invention may further include a supplemental anchoring mechanism as shown in FIGS. 1, 7 and 11–13. More particularly, these figures show the base 14 provided with an anchoring aperture 33 disposed substantially beneath the post 13. The anchoring aperture 33 includes a ramped front face 33F that faces rearwardly and downwardly. The aperture 33 further includes a ramped locking rear face 34 that faces upwardly and forwardly. An anchor 35 is securely mounted in the floor F and includes an enlarged head 35H spaced slightly above the floor F. Disengagement of the latch 17 enables a rearward sliding movement of the base 14 relative to the game machine 11. This rearward sliding movement will cause the ramped front face 33F to ride over the enlarged head 35H of the anchor 35. This will cause only a slight tilting of the base 14, with the rear end 14R being slightly higher than the front end 14F. Upon completion of work on the game machine 11, the worker merely slides the base 14 forwardly. The anchor 35 then will be positioned in the anchoring aperture 33, and sufficient forward movement of the base 14 will cause the ramp anchoring face 34 to slide slightly under the enlarged head 35H of the anchor 35. This positioning of the ramp anchoring face 34 beneath the head 35H of the anchor 35 will prevent rear portions of the base 14 and the seat 12 from being lifted upwardly away from the floor. Thus, a more secure retention of the chair is provided by the anchor 35. As shown in FIG. 1, the rear ramped anchor face 34 is angularly aligned continuously between the opposed faces of the base 14. FIGS. 11–13, on the other hand, show a stepped configuration which can achieve a more secure anchoring.

While the invention has been described with respect to a preferred embodiment, it is apparent that various changes can be made without departing from the scope of the invention as defined by the appended claims.

What is claimed is:

1. A quick release locking mechanism which is operably mounted between a game machine chair and a game machine, the game machine chair being supported on a floor in front of the game machine, the quick release locking mechanism comprising:

a generally planar base having a front edge, the chair being fixedly secured to the base at a location rearwardly from the front edge, a locking surface defined on the base in proximity to the front edge;

a locking channel secured to the game machine in proximity to the floor, the locking channel including a front wall facing the chair, a latch cavity being formed in the locking channel and an unlocking aperture extending through the front wall and into the latch cavity; and a latch moveably engaged in the latch cavity in proximity to the floor, the latch having a slanted front face for engagement by the front edge of the base such that forces generated by sliding the front edge of the base against the slanted front face of the latch lift the latch sufficiently for sliding movement of the front edge of the base beneath the latch, the latch further being alignable with the locking surface of the base such that in response to the alignment of the latch with the locking surface on the base, the latch falls into locked engagement with the base for securely holding the base and the chair in proximity to the gaming machine.

2. The quick release locking mechanism of claim 1, further comprising means for aligning the locking surface of the base with the latch.

3. The quick release locking mechanism of claim 1, wherein the locking surface on the base is defined by an aperture formed through the base at a location in proximity to the front edge of the base.

4. A quick release locking mechanism of claim 1, wherein the locking surface on the base comprises a locking projection extending upwardly from the base.

5. The quick release locking mechanism of claim 4, wherein the locking projection includes a ramped front face aligned at an acute angle to the planar base and a locking rear face aligned substantially perpendicularly to the planar base.

6. The quick release locking mechanism of claim 1, wherein the latch includes a tapered aperture at least partly alignable with the unlocking aperture in the front wall of the locking channel, the tapered aperture being engageable for lifting the latch out of engagement with the base.

7. The quick release locking mechanism of claim 6, further comprising a key slidably insertable into the unlocking aperture in the front wall of the locking channel for lifting the latch out of engagement with the base.

8. A quick release mechanism which is operably mounted between a game machine chair and a game machine, the game machine chair being supported on a floor in front of the game machine, the quick release mechanism comprising;

a generally planar base having a front edge, the chair being fixedly secured to the base at a location rearwardly from the front edge, a locking surface defined on the base in proximity to the front edge;

a locking channel secured to the game machine, the locking channel being formed with a latch cavity therein;

a latch moveably engaged in proximity to the floor and substantially adjacent the game machine, the latch having a slanted front face for engagement by the front edge of the base such that forces generated by sliding the front edge of the base against the slanted front face of the latch lift the latch sufficiently for sliding movement of the front edge of the base beneath the latch, the latch further being alignable with the locking surface of the base; and a spring engaged in the locking channel for urging the latch downwardly in a direction for locked engagement with the base, such that in response to the alignment of the latch with the locking surface on the base, the spring urges the latch into locked engagement with the base for securely holding the base and the chair in proximity to the game machine.

9. A quick release mechanism which is operably mounted between a game machine chair and a game machine, the game machine chair being supported on a floor in front of the game machine, the quick release locking mechanism comprising:

a generally planar base having a front edge, the chair being fixedly secured to the base at a location rearwardly from the front edge, a locking surface defined on the base in proximity to the front edge;

a latch moveably engaged in proximity to the floor and substantially adjacent the game machine, the latch having a slanted front face for engagement by the front edge of the base such that forces generated by sliding the front edge of the base against the slanted front face of the latch lift the latch sufficiently for sliding movement of the front edge of the base beneath the latch, the latch further being alignable with the locking surface of the base such that in response to the alignment of the latch with the locking surface on the base, the latch falls into locked engagement with the base for securely holding the base and the chair in proximity to the game machine; and an anchoring aperture disposed in the base substantially in alignment with the chair, and an anchor being securely mounted to a region of the floor for engagement with the anchoring aperture to prevent lifting of the base when the locking surface of the base is engaged with the latch.

10. A quick release mechanism for a game machine chair according to claim 9, wherein the anchor includes an enlarged head spaced from the floor, the anchoring aperture including at least one tapered anchoring surface disposed and configured for sliding beneath the anchoring head and the floor when the base is locked with the latch.

11. A quick release locking mechanism which is operably mounted between a game machine chair and a game machine, the game machine chair being supported on a floor in front of the game machine, the quick release locking mechanism comprising:

a generally planar base having a front edge, the chair being fixedly secured to the base at a location rearwardly from the front edge, a locking aperture extending at least partly into the base at a location between the front edge and the location at which the chair is fixedly secured to the base;

a locking channel secured to the game machine in proximity to the floor, the locking channel including a front wall facing the chair, a latch cavity being formed in the locking channel and an unlocking aperture extending through the front wall and into the latch cavity; and a latch engaged in the latch cavity for movement substantially parallel to the front wall of the locking channel from a locking position substantially adjacent the floor to an unlocking position spaced from the floor, at least portions of said latch being dimensioned for insertion into the locking aperture in the base, the latch being formed with a latch aperture aligned with the unlocking aperture in the front wall of the locking channel, whereby the latch aperture is accessible at the unlocking aperture in the front wall of the locking channel for selectively moving said latch substantially parallel to the front wall of the locking channel.

12. The quick release locking mechanism of claim 11, further comprising a spring engaged in the locking channel for urging the latch downwardly in a direction for locked engagement with the base.

13. The quick release locking mechanism of claim 11, further comprising means for aligning the latch with the locking aperture in the base.

14. The quick release mechanism of claim 13, wherein the means for aligning comprises at least one projection formed on the locking channel and at least one recess formed on the base.

\* \* \* \* \*